US007014328B2

(12) United States Patent
Weber et al.

(10) Patent No.: US 7,014,328 B2
(45) Date of Patent: Mar. 21, 2006

(54) APPARATUS FOR TILTING A CARRIER FOR OPTICAL ELEMENTS

(75) Inventors: Ulrich Weber, Ulm (DE); Hubert Holderer, Koenigsbronn (DE); Alexander Kohl, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 20 days.

(21) Appl. No.: 10/119,182

(22) Filed: Apr. 8, 2002

(65) Prior Publication Data

US 2002/0171952 A1 Nov. 21, 2002

(30) Foreign Application Priority Data

Apr. 12, 2001 (DE) ................................ 101 18 455

(51) Int. Cl.
*G02B 7/18* (2006.01)
*G02B 7/182* (2006.01)

(52) U.S. Cl. ...................... 359/850; 359/872; 359/876; 359/896

(58) Field of Classification Search ................ 359/225, 359/855, 866, 896, 850, 872, 876; 248/481
See application file for complete search history.

(56) References Cited

U.S. PATENT DOCUMENTS 3,879,105 A * 4/1975 Broche et al. .............. 359/431
4,705,369 A * 11/1987 Humpal ...................... 248/476
4,722,592 A * 2/1988 Stolfi ......................... 359/831
4,826,304 A * 5/1989 Guch et al. ................. 359/831
4,932,770 A * 6/1990 Caravaty .................... 359/866
5,089,911 A * 2/1992 Weyrauch et al. .......... 359/554
5,400,184 A * 3/1995 Kuklo ........................ 359/873
5,428,482 A 6/1995 Bruning et al. ............. 359/827
5,529,277 A * 6/1996 Ostaszewski ............... 248/603
5,666,227 A * 9/1997 Ben-Ghiath ................. 359/630
5,694,257 A * 12/1997 Arnone et al. .............. 359/822
6,229,657 B1 5/2001 Holderer et al. ............ 359/822
6,252,712 B1 6/2001 Fürter et al. ................ 359/499
6,275,344 B1 8/2001 Holderer ..................... 359/822
6,290,363 B1 * 9/2001 Masutani .................... 359/856
6,552,862 B1 4/2003 Dieker ....................... 359/819

FOREIGN PATENT DOCUMENTS

CH 371906 10/1963
DE 3406907 A 1 10/1984
DE 198 25 716 A 1 12/1999
DE 199 10 947 A 1 9/2000
EP 0 053 263 A2 6/1982
EP 0 053 463 A2 6/1982
EP 0 230 277 A2 7/1987
EP 0 964 281 A1 12/1999
EP 1 209 600 A2 5/2002

* cited by examiner

*Primary Examiner*—John Juba, Jr.
(74) *Attorney, Agent, or Firm*—Wells St. John, P.S.

(57) ABSTRACT

The invention relates to an apparatus for tilting a carrier for optical elements with two optical faces which are arranged together on a carrier and are fixed at a fixed angle to one another, the carrier being fastened on a base plate via articulated connections. The carrier can be pivoted about three tilting axes, a first tilting axis preferably being located in the plane of the first optical face and extending normal to the plane of the second optical face, the second tilting axis preferably being located in the plane of the second optical face and extending normal to the plane of the first optical face, and the third tilting axis being located parallel to the line of intersection between the two planes of the optical element.

33 Claims, 13 Drawing Sheets

APPARATUS FOR TILTING A CARRIER FOR OPTICAL ELEMENTS

RELATED APPLICATION

This application relates to and claims priority to corresponding German Patent Application No. 101 18455.7 filed on Apr. 12, 2001.

BACKGROUND OF THE INVENTION

1. Field of the Invention

The invention relates to an apparatus for tilting a carrier for optical elements with two optical faces which are arranged together on a carrier and are fixed at a fixed angle to one another, the carrier being fastened on a base plate via articulated connections.

More specifically the invention refers to two mirrors, e.g. plane mirrors as optical elements and also for a beam splitter as optical element.

2. Description of the Related Art

In the case of optical systems with a plurality of optical axes, the light beams are deflected by mirrors, prisms or beam splitters. For this purpose, it is known, for example, for two plane mirrors, which form a fixed angle between them, to be arranged on a common carrier. The optical elements adjacent to the carrier have to be aligned precisely in relation to one another, this also requiring, for example, precise air clearances to be maintained. If the air clearances are co-ordinated, and the three dihedral angles of the mirror carrier are pre-adjusted, problems arise for the precision adjustment of the dihedral angle. If the tilting angle of one of the two mirrors changes, then this change likewise results in a change in tilting and air clearance for the other mirror, since the two mirrors are fixed to one another. For this reason, in some circumstances, a number of high-outlay follow-up adjustments are then necessary. The mirror carrier thus has to be adjusted in at least five degrees of freedom. If the precise location of the mirror carrier is adjusted beforehand, the latter just has to be tilted about three spatially arranged axes for an orientation adjustment.

In the case of known tilting apparatuses, then, a change in tilting angle in the case of one of the two mirrors is also associated with a change in location of the mirror carrier. The location of the mirror carrier is designed, for example, via a reference point RP which is spaced apart from an adjacent optical element by a certain distance a and from another optical element by a certain distance b. In the case of known changes in tilting angle for a mirror, the reference point is displaced, as a result of which the values a and b also change, as does the location of the mirror carrier. It is thus disadvantageously necessary for the location of the mirror carrier and the values a or be to b corrected again.

This means that there are two problems. If the air clearances are left unchanged or are included in the calculation, then the location of the apparatus has to be adjusted precisely beforehand. The advantage of this configuration is that there is no need for any reference point for adjustment purposes.

In the case of a second, more straightforward type of adjustment, in contrast, a reference point is required. In this case, however, the air clearances are not yet provided and adjustment via an image or via optical imaging is not possible, in some circumstances, due to the lack of imaging. In order to co-ordinate the air clearances, the mirror carrier then also has to be rotated correspondingly about the defined reference point RP. In the case of the first-mentioned possibility, in which case the air clearances are included in the calculation, an optical image may already be present for the precision adjustment of the tilting.

SUMMARY OF THE INVENTION

The object of the present invention is to provide a tilting apparatus for carriers for a plurality of optical elements in the case of which a change in tilting on one optical element, e.g. a plane mirror or a beam splitter only insignificantly affects, if at all, the other optical element or elements. It is intended here for it to be possible for the carrier to be adjusted in three directions in space and, if appropriate, for there to be no change in the location of the carrier or the air clearances in relation to the adjacent optical elements, with the results that there is no need for any follow-up adjustments.

A first solution proposes that the carrier can be pivoted about three tilting axes, a first tilting axis, for tilting the first optical face, extending normal to the plane of the second optical face, the second tilting axis, for tilting the second optical face, extending normal to the plane of the first optical face, and the third tilting axis being located parallel to the line of intersection between the two planes of the optical element.

A very advantageous configuration of the invention may provide that the first tilting axis is located at the point at which the optical axis passes through the plane of the first optical face, and that the second tilting axis is located at the point at which the optical axis passes through the plane of the second optical face.

By virtue of this configuration, only extremely small displacement distances are necessary for the optical element.

If the above mentioned three conditions are fulfilled, tilting adjustment of one of the two optical faces is possible without the other face in each case being adjusted out of line and without any change in air clearance. Purely from a design point of view, it is possible, for this purpose, for the carrier, for example, to be fastened cardanically on a base plate. The optical element can be a mirror structure with two mirrors as optical faces or a beam splitter.

An advantageous configuration of the invention may provide that the tilting articulations are formed by solid-state articulations.

Since only small distances are necessary for adjustment, solid-state articulations are suitable here in particular since they allow very precise and reproducible displacements.

Since only very small adjusting angles occur in practice, the adjustment may be regarded as being linear and, in a simplified embodiment of the invention, it is thus possible for the tilting axes to be designed in the form of four-bar mechanisms, it being possible for the instantaneous centre of rotation to be located on the desired axes in each case.

A second solution according to claim 9 describes a simplified tilting apparatus, wherein the carrier is arranged to be pivot about a plurality of tilting axes which all run through a reference point.

In the case of this solution according to the invention, there are then no translatory displacements, which would mean a change in location, at the reference point RP. In order to define the air clearances, the carrier then has to be rotated from the reference point RP. In this case, however, the installation values a and b are maintained since the carrier is no longer displaced.

The simplified tilting apparatus can be used for all components which have to be adjusted in at least five degrees of freedom. This is thus also possible, for example, for prisms and beam splitter cubes.

It is advantageously provided here that the vertex of the carrier or the point of intersection between the two mirror planes is used as the reference point RP.

It is also advantageously possible here to provide solid-state articulations for adjusting the tilting axes.

In comparison with the solution mentioned in claim 1, the tilting apparatus here is indeed more straightforward but since possibly even in the case of small amounts of tilting decentring of the carriers there is still no image or optical imaging provided, the apparatus can only be adjusted by trial or measurement of the tilting angles.

Additional advantages of the present invention will become apparent to those skilled in the art from the following detailed description of exemplary embodiments of the present invention.

DETAILED DESCRIPTION

Figure 1:
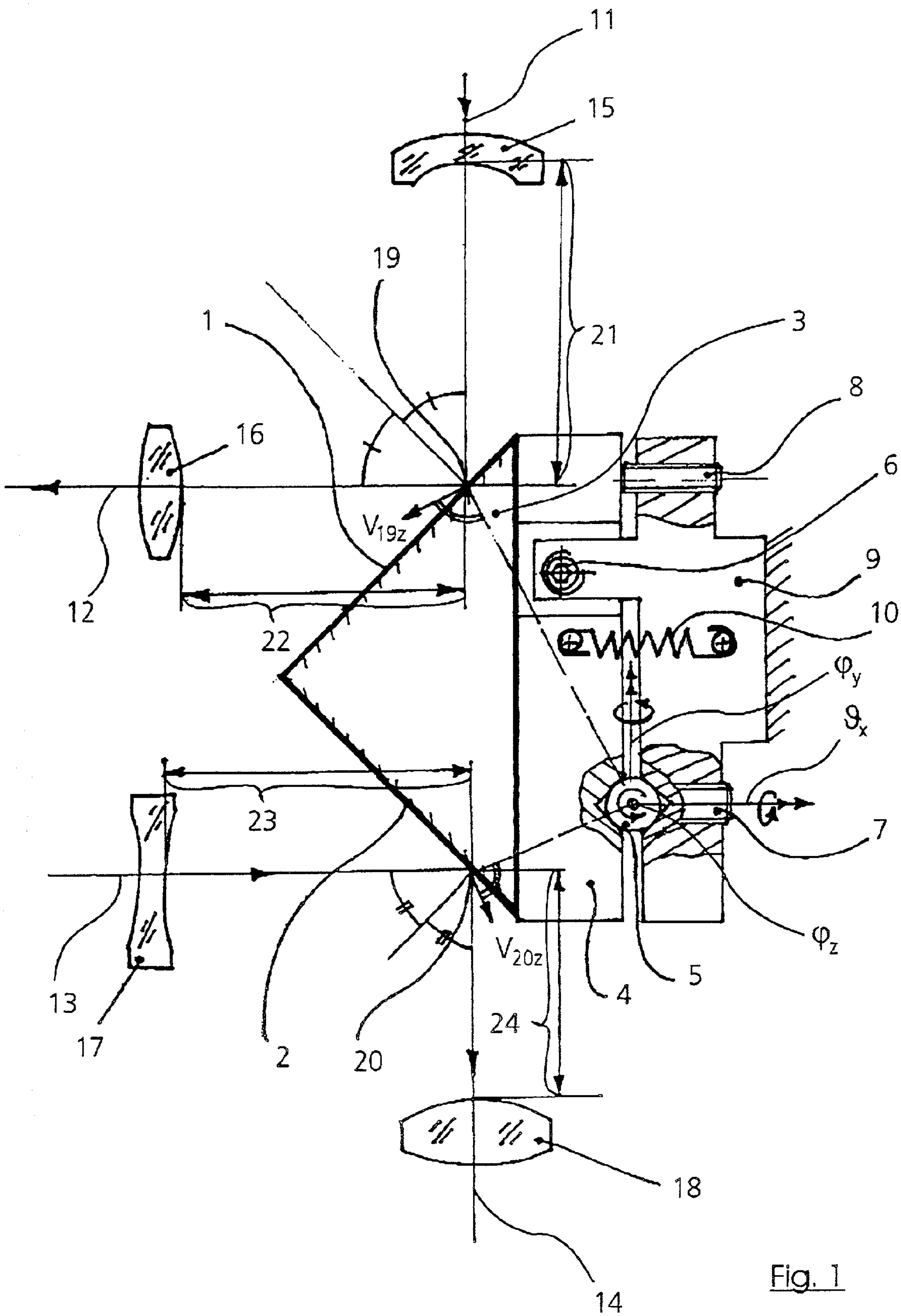
FIG. 1 shows an apparatus according to the prior art with two plane mirrors arranged on a mirror carrier.

Two plane mirrors 1 and 2, according to FIG. 1, are fixed on a carrier, namely a mirror carrier 3, at a fixed angle to one another. The mirror carrier 3 is connected firmly to a top plate 4. The top plate 4 is mounted on a ball 5 and adjusting screws 6, 7 and 8 such that an adjusting screw 6 can be used to adjust tilting about the $\phi_x$ axis. The adjusting screw 7, which is offset depthwise in relation to the drawing plane, is used to adjust tilting about the $\phi_y$ axis and the adjusting screw 8 is used to adjust tilting about the $\phi_z$ axis. All three tilting axes run through the center point of the ball 5. The ball 5 and the adjusting screws 6, 7 and 8 are mounted in the base plate 9 which, in turn, is connected firmly to the outside, e.g. the mount of a lens system. By means of a tension spring 10 between the top plate 4 and the base plate 9, the top plate 4 is pressed against the ball 5 and the adjusting screws 7 and 8.

The mirror carrier 3, then, is intended to be aligned in relation to the optical axes 11, 12, 13 and 14, in which case it is also necessary to maintain the air clearances 21, 22, 23 and 24 in relation to the adjacent optical elements, e.g. lenses 15, 16, 17 and 18.

If the optical axes 11, 12, 13 and 14 are located in one plane, the mirror carrier 3 has to be aligned in five respects, two air clearances and the three dihedral angles $\phi_x$, $\phi_y$ and $\phi_z$. Since, in FIG. 1, all the optical axes 11 to 14 are intended to be located in one plane, a displacement of the mirror carrier normal to the drawing plane causes he mirrors 1 and 2 to be replicated as before, with the result that there is no need to co-ordinate the location of the mirror carrier 3 perpendicular to the drawing plane. There is thus only a need for co-ordination in five, instead of six, respects.

The location of the mirror carrier 3 in the drawing plane is only determined by two air clearances, the other two air clearances resulting automatically because the optical elements 15 to 18 adjacent to the mirror carrier 3 have to be aligned precisely in relation to one another.

If the air clearances 21 to 24 are coordinated and the three dihedral angles of the mirror carrier 3 are pre-adjusted, it is beneficial, for the precision adjustment of the three dihedral angles, for it to be possible for the mirror carrier 3 to be tilted without any change in the air clearances 21 to 24, since, otherwise, there is a need for a new change in air clearance and, resulting from this, possibly also a new angle adjustment.

During tilting adjustment of the mirror 1, changes in tilting to the other mirror 2, and vice versa, have a similarly disruptive effect.

As can be seen from FIG. 1, which describes the prior art, up until now, a change in tilting angle in the case of one of the two mirrors was accompanied by a change in tilting and air clearance of the other mirror, since the two mirrors are fixed in relation to one another on the mirror carrier. That is to say, if the tilting of one mirror is adjusted, the tilting and the air clearance of the other mirror has to be corrected again, which results in a new adjustment operation.

This means, in the case of the known apparatus, that a change in tilting angle in the case of one mirror is also associated with a change in the air clearances 21 to 24 and with a change in tilting of the other mirror.

If, for example, the $\phi_z$ tilting angle of the mirror 1 is adjusted, then the air clearances 21, 22, 23 and 24 nevertheless also change because the point 19, the point of intersection between the optical axis 11 and the mirror plane 1, and the point 20, the point of intersection between the optical axis 13 and the mirror plane 2, are displaced in accordance with the vector $v_{19_z}$ and $v_{20_z}$, respectively.

The normal component of the displacement $c_{19_z}$ in relation to the mirror plane 1 results in changes in length in the air clearances 21 and 22; the normal component of the displacement $c_{20_z}$ in relation to the mirror plane 2 results in changes in length in the air clearances 23 and 24.

On account of being firmly interconnected by the mirror carrier 3, the $\phi_z$ tilting angle adjustment of one mirror is inevitably accompanied by the $\phi_z$ tilting angle adjustment of the other mirror. In the case of the two mirrors having a common carrier, separation of the $\phi_z$ tilting movement is not possible.

The only possible improvement in the case of the $\phi_z$ tilting angle adjustment is to avoid changes in air clearance.

In the case of the $\phi_x$ and $\phi_y$ tilting angle of one of the two mirrors being adjusted, changes in tilting, in addition to changes in air clearance, to the other mirror occur since the respective tilting axes are not oriented normal to the mirror surface which is not to be tilted.

For a more straightforward adjustment here, it is necessary to suppress, in addition to the changes in air clearance, also the tilting movements of the mirror which is not to be tilted.

According to the invention, then, the intention is to isolate from one another the degrees of freedom for adjusting the pair of mirrors 1, 2 and/or the mirror carrier 3.

This is achieved, in the case of small tilting movements, by utilizing sensitive and insensitive movements of an individual mirror. If the tilting of one of the two mirrors is changed, then the other mirror only executes movements which do not result in any change in tilting and air clearance to said mirror (insensitive movement).

Taking, for example, the point of intersection 19 between the optical axis 11 and the mirror 1 there are three sensitive movements for the point 19:

- translation z normal to the mirror plane 1
- tilting $\alpha_x$ about an axis in the mirror plane 1
- tilting $\alpha_y$ about an axis in the mirror plane 1, but perpendicular to the tilting $\alpha_x$.

Translation normal to the mirror plane 1 at the point of intersection 19 means a change in air clearance 21 and 22.

Tilting actions in the mirror plane 1 give rise to different deflecting angles for the beam on the optical axis 11, with the result that, following reflection on the mirror 1, the light beam deviates from the desired optical axis 12.

There are also three insensitive movements, in the case of which the mirror plane 1 is replicated as before:

- translation x in the mirror plane 1
- translation y in the mirror plane 1, perpendicular to the translation x
- tilting $\alpha_z$ about the axis normal to the mirror plane 1.

Figure 2:
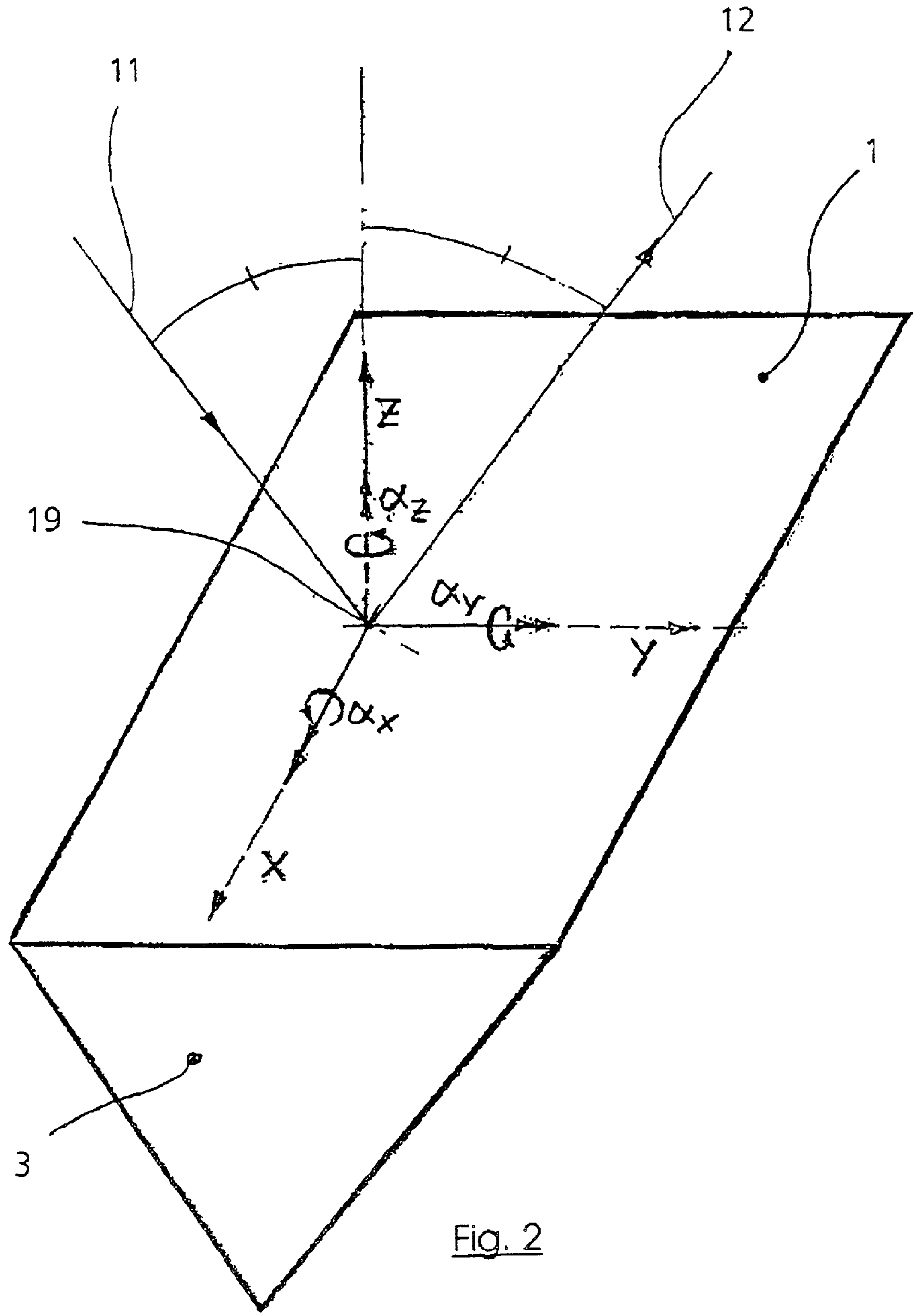
FIG. 2 shows a mirror with an illustration of different movement directions.

In FIG. 2, sensitive movement directions for the mirror 1 are illustrated by solid lines and insensitive movement directions for the mirror 1 are illustrated by dashed lines.

For the mirror 2, analogously to mirror 1, there are also sensitive and insensitive movements. The insensitive movements cause the mirror 2 to be replicated as before.

Figure 3:
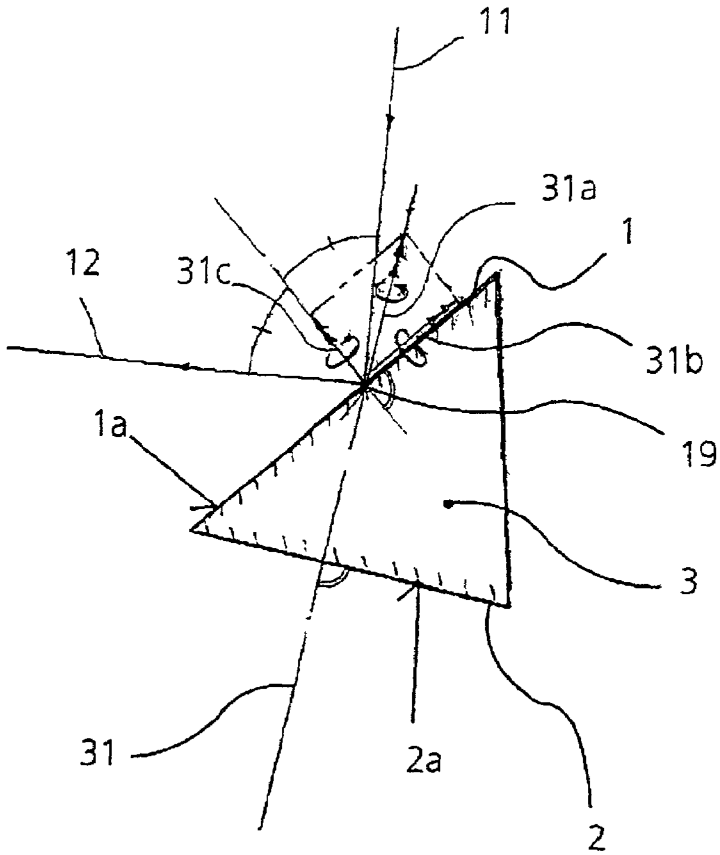
FIG. 3 shows a diagram with a mirror tilted about one tilting axis.

As can be seen from FIG. 3, for the precision tilting adjustment of the mirrors 1 and 2, a first tilting axis 31 runs through the point of intersection 19 between the optical axis 11 and the mirror 1, the direction thereof being oriented normal to the mirror 2.

Rotation of the mirror 1 about the tilting axis 31 causes the mirror plane 2*a* to be replicated as before, with the result that neither changes in tilting nor changes in air clearance occur at the mirror 2.

It is also possible here for no changes in air clearance to occur for the mirror 1, since the tilting axis 31 runs through the point of intersection 19 between the optical axis 11 (or the optical axis 12) and the mirror plane 1*a*.

If the mirrors 1 and 2 do not enclose a right angle, a tilting movement 31*a* for the mirror 1 divides up into tilting 31*b* in the mirror plane 1 and tilting 31*c* normal to the mirror plane 1.

The tilting 31*c* causes the mirror 1 to be replicated as before. The mirror 1 is thus effectively tilted only by the tilting component 31*b* in the mirror plane 1.

Figure 4:
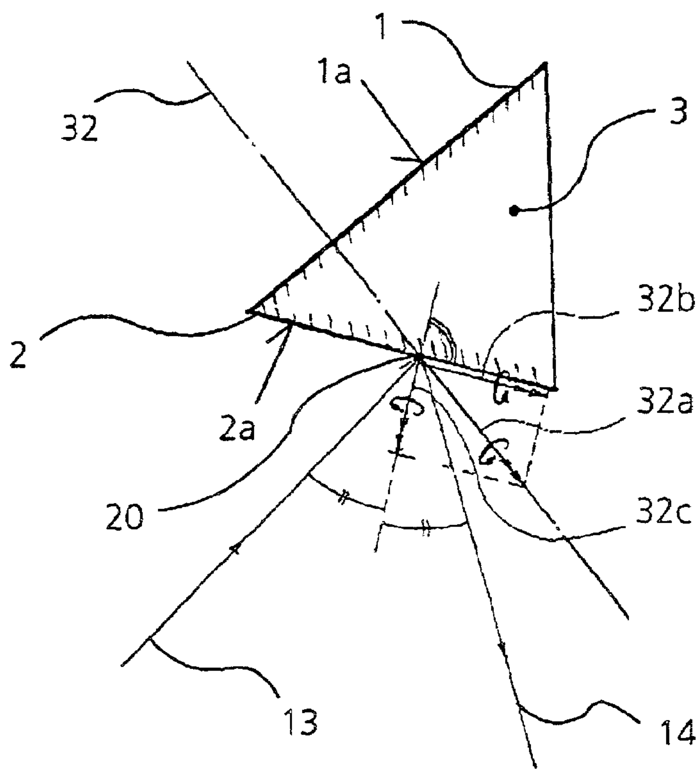
FIG. 4 shows a diagram with the second mirror tilted about one tilting axis.

As can be seen from FIG. 4, in a manner analogous to the first tilting axis 31, the second tilting axis 32 runs normal to the mirror plane 1*a* through the point of intersection 42 between the optical axis 13 or 14 and the mirror 2, in order to achieve the situation where it is only the mirror 2 which tilts, without any changes in tilting or air clearance in the case of the mirror 1.

Figure 5:
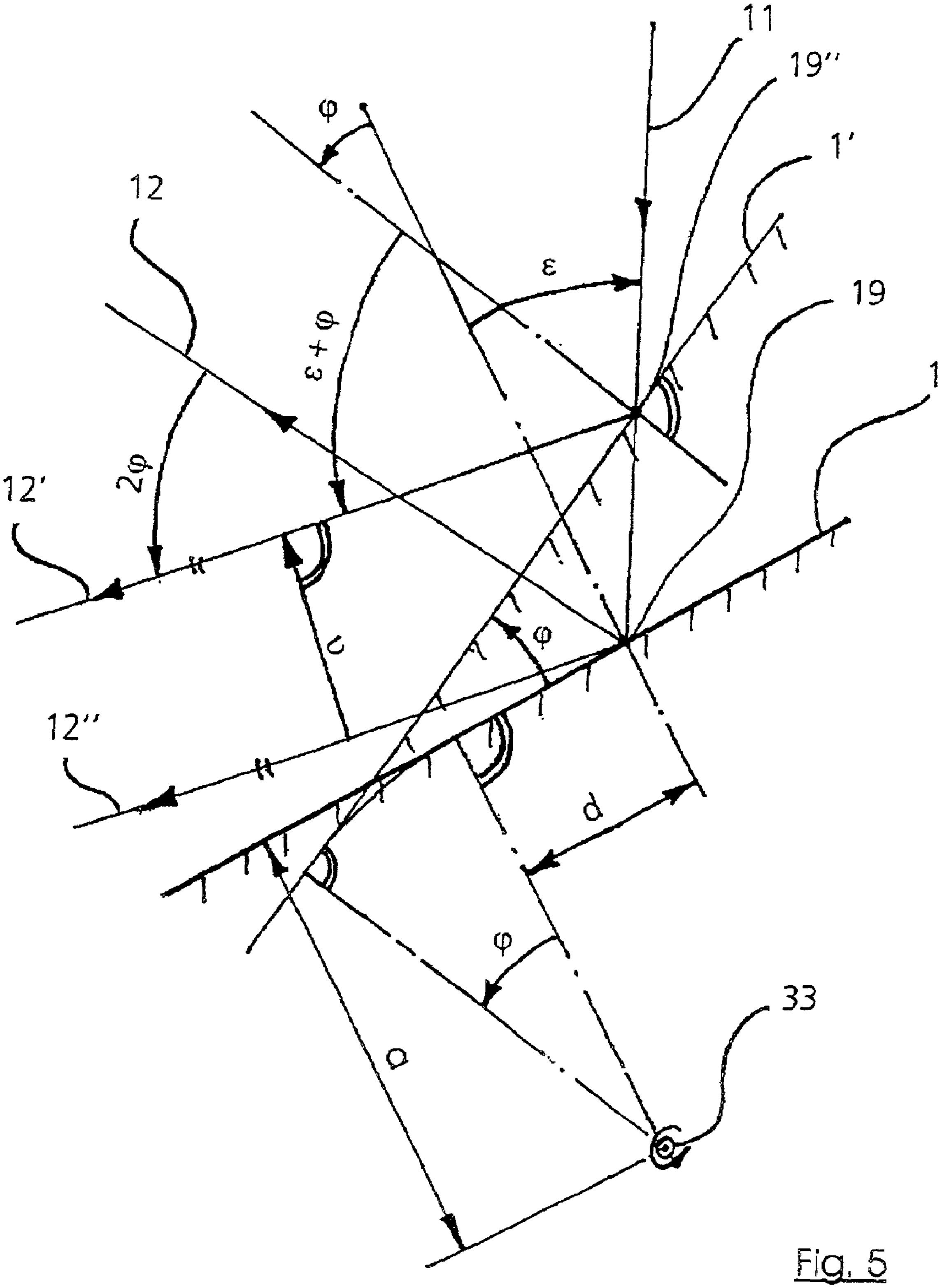
FIG. 5 shows a diagram with the first mirror tilted about a further tilting axis.

According to FIG. 5, the third tilting axis 33 runs parallel to the line of intersection between the mirror 1 and the mirror 2. In the case of this tilting, the mirror 1 and the mirror 2 are tilted at the same time, it being the intention for no change in the air clearances 21 to 24 to occur both in the case of the mirror 1 and in the case of the mirror 2.

In order for no change for the air clearances 21 and 22 to occur at the mirror 1, the third tilting axis 33 would have to run through the point of intersection 19 since, in this case, the point of intersection 19 is not displaced in a translatory manner.

It would likewise be necessary, however, for the third tilting axis 33 also to pass through the point of intersection 20, in order that no changes for the air clearances 23 and 24 occur at the mirror 2.

Since, however, the third tilting axis 33 cannot run through the points of intersection 19 and 20 at the same time, a compromise has to be found.

In FIG. 5, the mirror 1 is tilted at the tilting axis 33, which is spaced apart from the mirror plane 1 by the distance a and of which the normal to the mirror plane 1 is spaced apart from the point of intersection 19 by the distance d, through the angle $\phi$ into the position 1'.

In the process, the point of intersection 19 moves along the optical axis 11 into the position 19'.

By virtue of the mirror 1 being tilted through the angle $\phi$, the optical axis 12' reflected on the tilted mirror plane 1' deviates by the angle $2\phi$ from the original optical axis 12, the optical axis 12' nevertheless being spaced apart from the original point of intersection 19 by the distance u.

An optical axis 12", which intercepts the mirror 1 at the point of intersection 19 and runs parallel to the optical axis 12', would be desirable.

The lateral offset u of the optical axis 12' in relation to the desired optical axis 12" may be approximated, for small tilting angles $\phi$, by the following formula. The angle c here is the original angle of incidence of the optical axis 11 in relation to the mirror 1.

$$\mu = \frac{(\alpha\varphi^2 + 2d\varphi)\cdot\sin(2\varepsilon + 2\varphi)}{2(\cos\varepsilon - \varphi\sin\varepsilon)}$$

The distance d of the normal of the tilting axis 33 in relation to the mirror plane 1 has a linear influence on the tilting angle $\phi$, and thus contributes the most to the lateral offset u in the case of small tilting angles $\phi$. In order for this disruptive lateral offset u to be reduced as far as possible, the tilting axis 33 has to be located such that the normal of the tilting axis 33 in relation to the mirror plane 1 intersects the mirror 1 at the point of intersection 19 (see FIG. 6).

The lateral offset u is then simplified to the minimal lateral offset $u_{min}$:

$$\mu_{\min} = \frac{\alpha\varphi^2 \cdot \sin(2\varepsilon + 2\varphi)}{2(\cos\varepsilon - \varphi\sin\varepsilon)}$$

On account of the quadratic dependence of the axial offset $u_{min}$ on the tilting angle $\phi$, very small tilting angles $\phi$ only result in small values for the lateral offset $u_{min}$, which may still be located within the tolerance range.

In a manner analogous to the mirror 1, it would also be necessary for the tilting axis 33 to be located on the normal to the mirror plane 2, at the point of intersection 20 between the optical axis 13 or 14 and the mirror 2.

Figure 6:
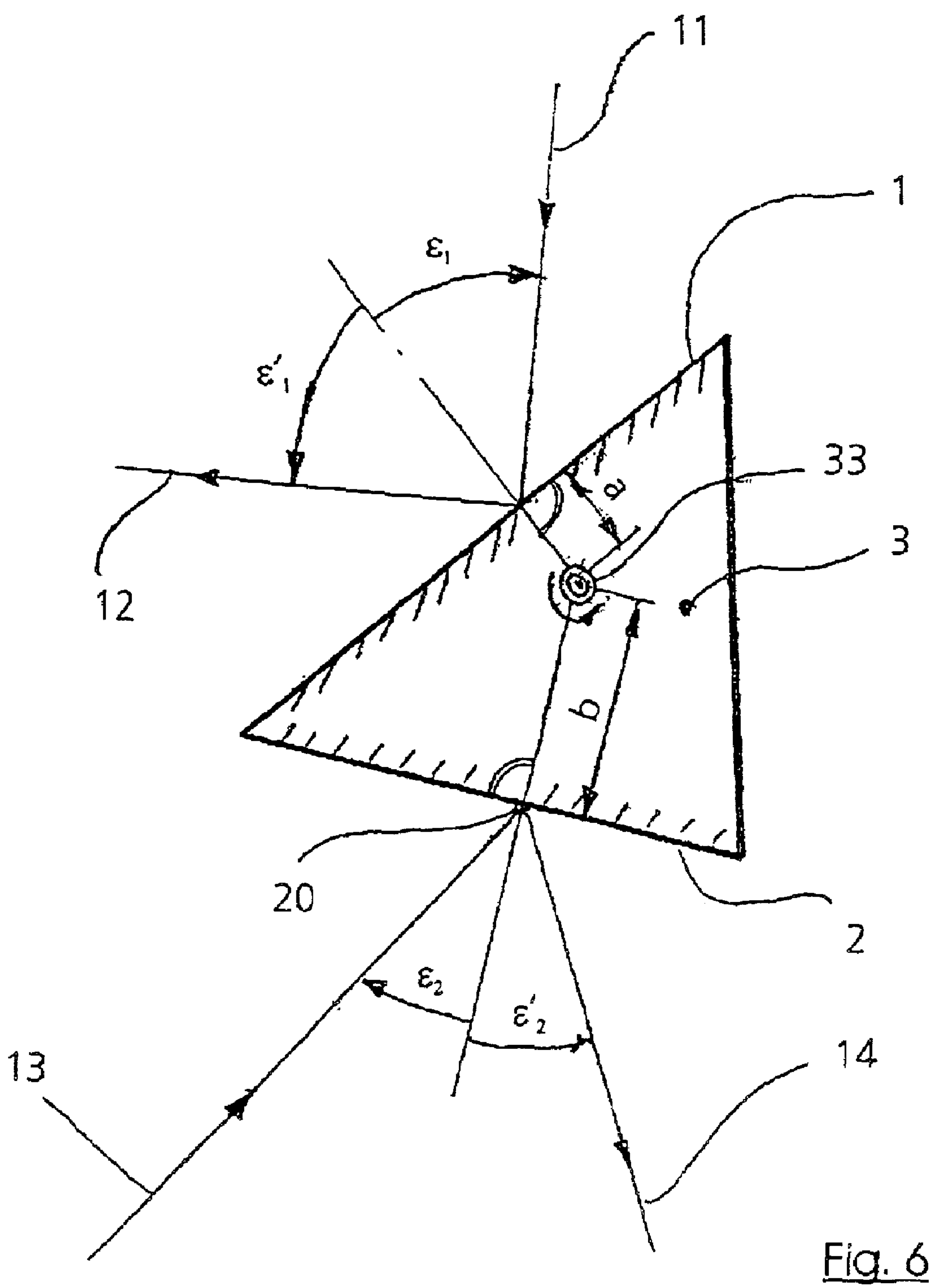
FIG. 6 shows a diagram with tilting about the tilting axis according to FIG. 5, the tilting axis being located at a different location.

The tilting axis 33 is thus obtained from the point of intersection between the normal to the mirror 1 at the point of intersection 19 and the normal to the mirror 2 at the point of intersection 20 (FIG. 6).

The lateral offset $w_{min}$ at the mirror 2 (not illustrated) is calculated in a manner analogous to that for the mirror 1, b being the distance between the point of intersection 20 and the tilting axis 33 and $\eta$ being the angle of incidence at the mirror 2.

$$W_{\min} = \frac{b\varphi^2 \cdot \sin(2\eta + 2\varphi)}{2(\cos\eta - \varphi\sin\eta)}$$

Figure 7:
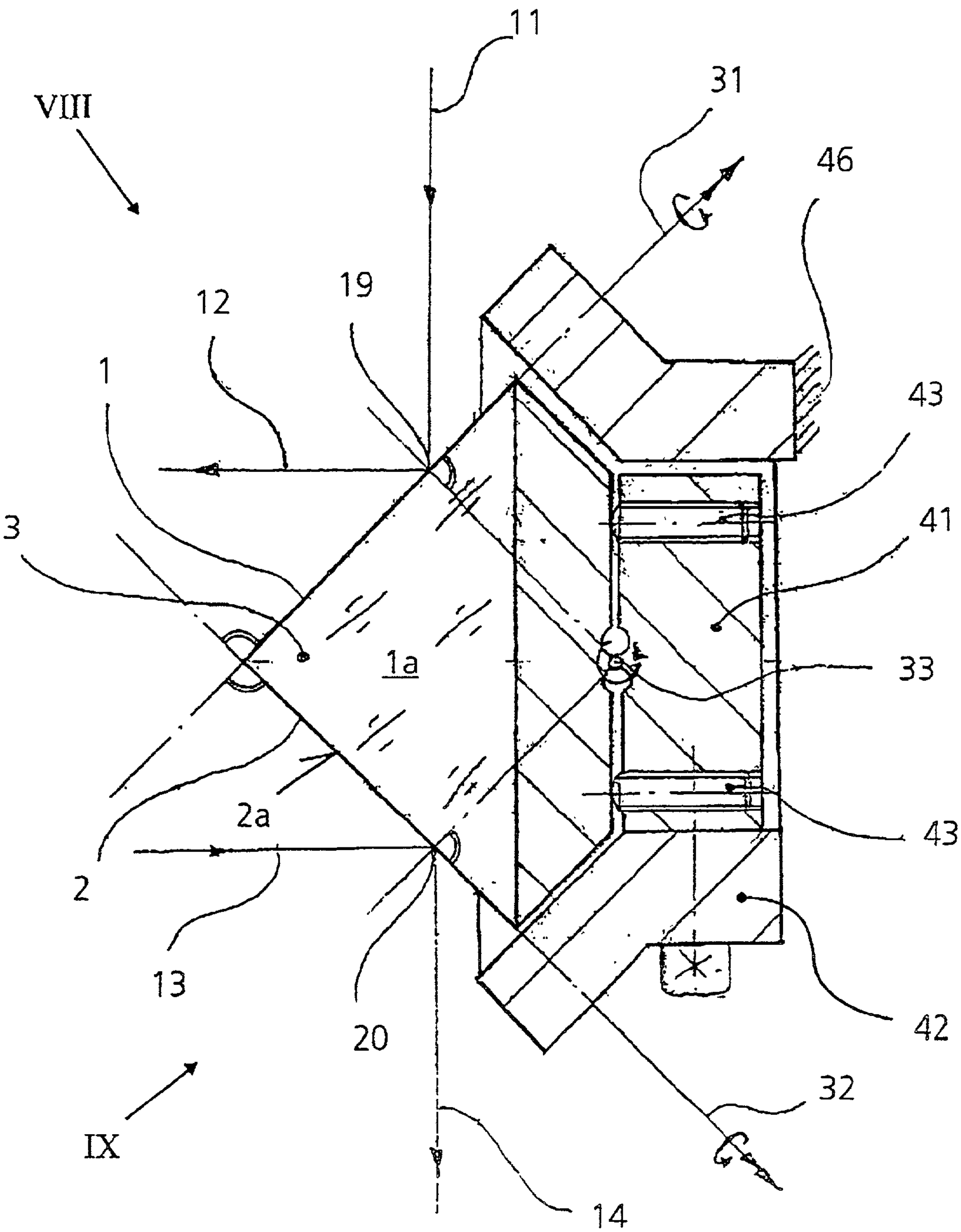
FIG. 7 shows a section through the apparatus according to the invention along the line VII—VII from FIG. 8.
Figure 8:
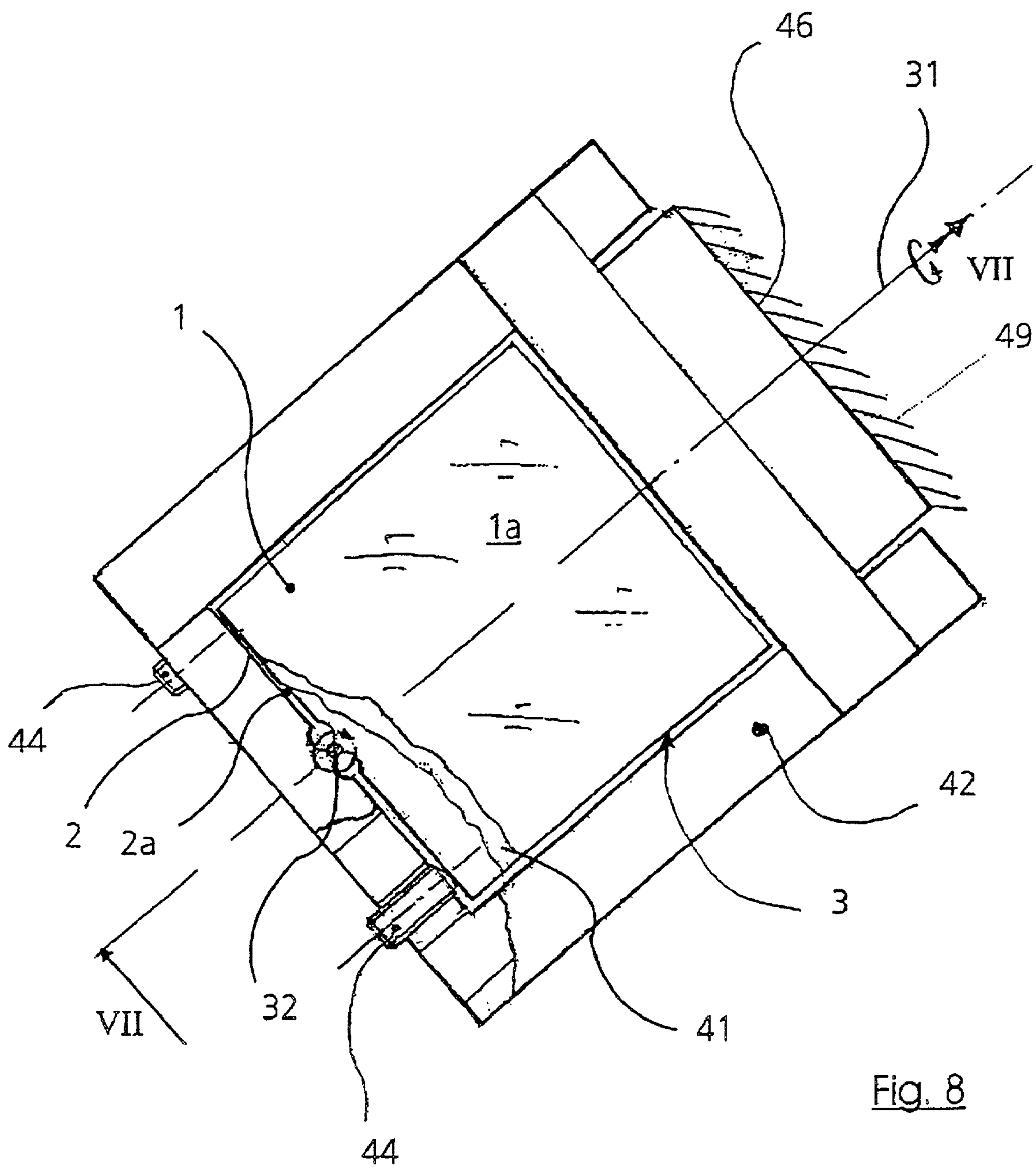
FIG. 8 shows a view according to the invention as seen in the direction according to arrow VIII in FIG. 7.
Figure 9:
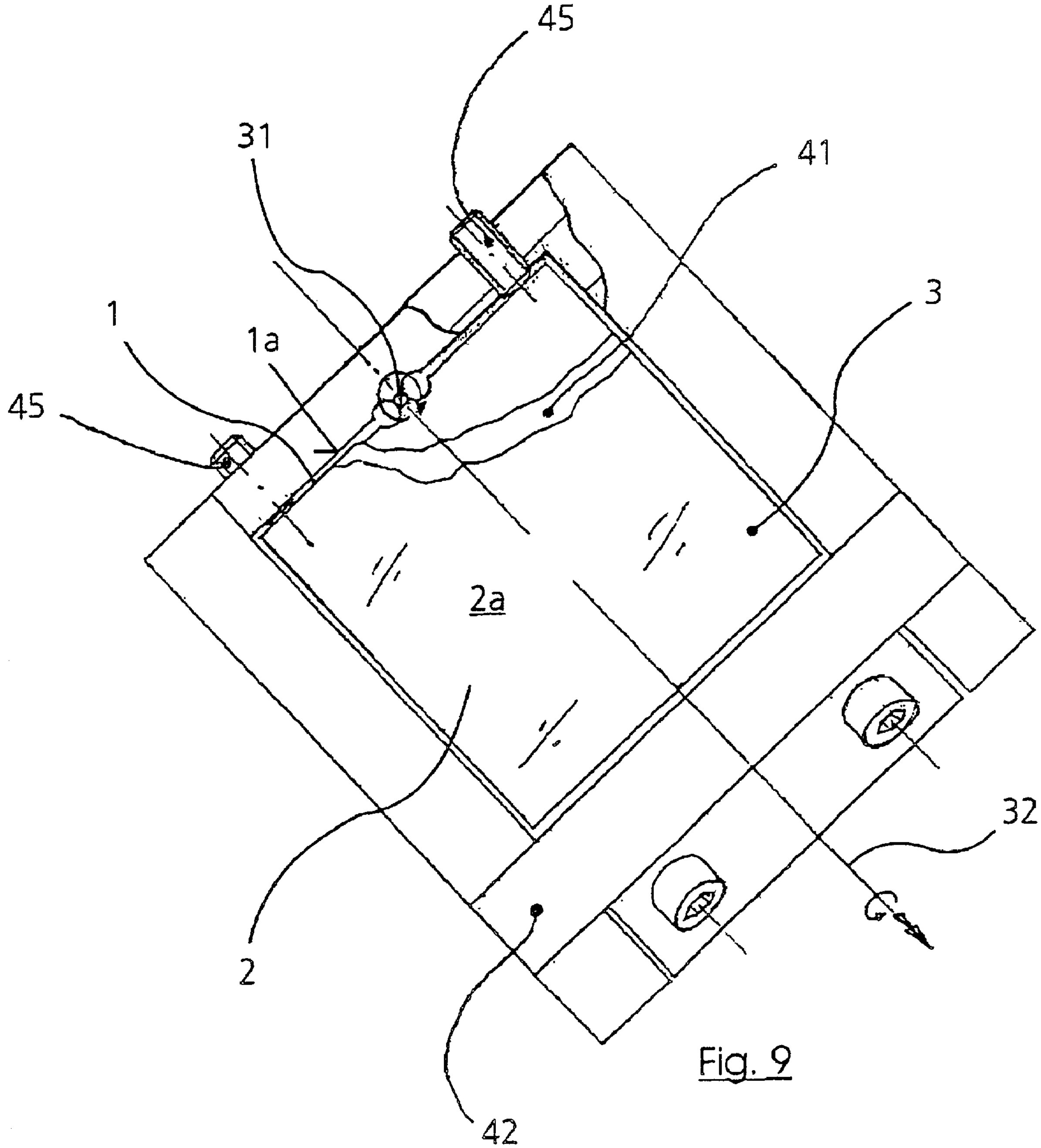
FIG. 9 shows a view as seen in the direction according to arrow IX from FIG. 7.

FIGS. 7 to 9 show an example of the design of an apparatus for tilting the mirror carrier 3 with the mirrors 1 and 2, the position of the three tilting axes 31, 32 and 33 in space having been selected in accordance with the above-described criteria.

The surfaces 1 and 2 of the mirror carrier 3 are mirror-coated and form the mirrors 1 and 2. Since the mirrors 1 and 2 enclose a right angle, the tilting axis 31 is located in the mirror plane 1*a* and the tilting axis 32 is located in the mirror plane 2*a*.

The mirror carrier 3 is connected firmly, via its rear side, to a solid-state articulation 41, of which the articulation axis coincides with the desired tilting axis 33. Adjusting screws 43 can be used to adjust the tilting angle about the axis 33 and fix the same.

The solid-state articulation 41 is connected firmly, on the other side, to a frame 42 which, in turn, is connected firmly, by way of a connection surface 46, to the outside, e.g. a lens-system housing part 49. Two solid-state tilting articulations are accommodated in the frame 42.

The articulation axis of one solid-state articulation coincides with the desired tilting axis 32, it being possible for adjusting screws 44 to be used to adjust the tilting about the axis 32 and to fix the same FIG. 8).

The articulation axis of the other solid-state articulation is located on the tilting axis 31. Adjusting screws 45 can be used to adjust the tilting about the axis 31 (FIG. 9).

The configuration of the tilting apparatus which is shown is only by way of example, so it is also possible for the solid-state articulations to be replaced by other rotary articulations. The essence of the invention is the position of the tilting axes 31, 32, 33 in relation to the mirror planes 1*a* and 2*a*, which allow tilting adjustment of one of the two mirrors 1 or 2 without the other mirror in each case being adjusted out of line and without any change in air clearance.

On account of the small angle-adjusting range, it is also possible for the tilting axes 31 to 33 to be approximated by four-bar mechanisms, of which the instantaneous center of rotation is located on the desired axes (not illustrated).

A simplified form of a tilting apparatus is described herein below, with reference to FIGS. 10 to 15, as an alternative to the exemplary embodiment explained above, FIG. 11 serving to explain the prior art.

For the sake of simplicity, the same designations have been retained for the same parts in this exemplary embodiment, too.

Figure 10:
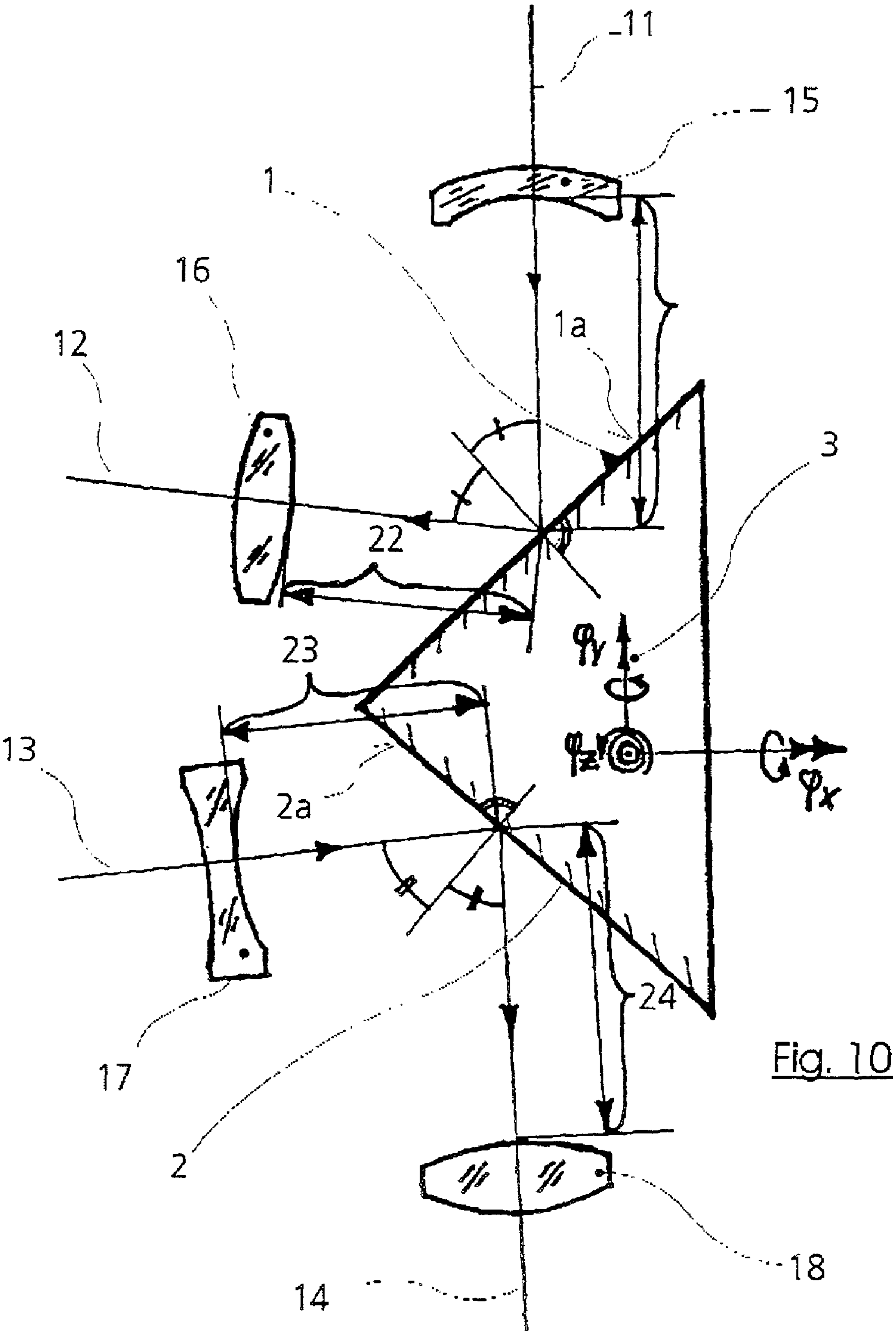
FIG. 10 shows a mirror carrier with two plane mirrors with different movement directions illustrated.
Figure 11:
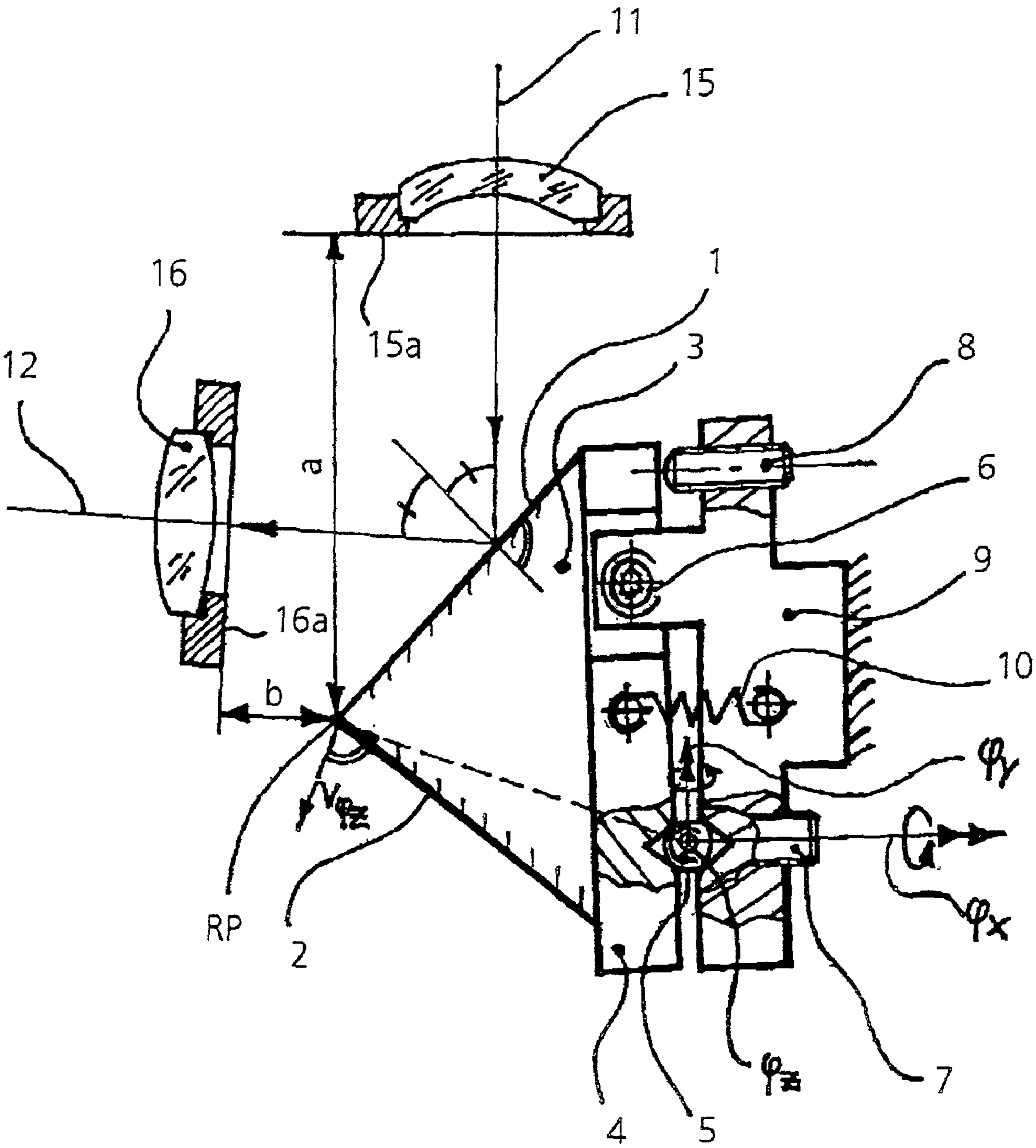
FIG. 11 shows an apparatus according to the prior art.

FIG. 10 shows the mirror carrier 3 with the two plane mirrors 1 and 2 with an indication of the degrees of freedom and the tilting possibilities. FIG. 11, in this respect, illustrates an apparatus according to the prior art. The mirror carrier 3 is intended to be aligned in relation to the optical axes 11, 12, 13 and 14, it also being intended to maintain the air clearances 21, 22, 23 and 24 in relation to the adjacent optical elements 15 to 18.

For this purpose, the mirror carrier 3 has to be adjusted in all six degrees of freedom, the three translatory degrees of freedom defining the location of the mirror carrier and the three rotary degrees of freedom defining the orientation of the mirror carrier.

If the location of the mirror carrier 3 has already been adjusted, the mirror carrier 3 may thus be tilted, for an orientation adjustment, about three spatially arranged axes such that its location is not lost during tilting.

According to FIG. 11, the mirror carrier 3, as with the first exemplary embodiment, is connected firmly to the top plate 4.

The top plate 4 is likewise mounted on the bowl 5 and the adjusting screws 6, 7 and 8 such that the adjusting screw 6 can be used to adjust the tilting about the $\phi_x$ axis, the adjusting screw 7, which is offset depthwise in relation to the drawing plane, can be used to adjust tilting about the $\phi_y$ axis, and the adjusting screw 8 can be used to adjust tilting about the $\phi_z$ axis. As in the first exemplary embodiment, all three tilting axes thus run through the center point of the bowl 5. The bowl 5 and the adjusting screws 6, 7 and 8 are mounted in the base plate 9 which, in turn, is connected firmly to the outside.

By means of the tension spring 10 between the top plate 4 and base plate 9, the top plate 4 is pressed against the bowl 5 and the adjusting screws 7 and 8.

In the case of the apparatus illustrated in FIG. 11, which corresponds to the prior art, a change in tilting angle in the case of one mirror is also accompanied by a change in location of the mirror carrier 3.

In FIG. 11, the location of the mirror carrier 3 is defined, by way of example, via the reference point RP on the mirror carrier 3 in relation to the reference surface 15*a* on the mount of the lens 15 and to the reference surface 16*a* on the mount for the lens 16. The reference point RP is intended to be spaced apart from the surface 15*a* by the distance a and from the surface 16*a* by the distance b.

If, for example, the mirror carrier 3 is adjusted by the $\phi_z$ tilting angle, then the reference point RP is displaced in accordance with the vector $v_{\phi z}$ shown, since the point of rotation is located at the center point of the bowl 5 rather than at the reference point RP.

The displacement of the reference point RP results in a change in the values a and b and thus in the location of the mirror carrier 3. It is thus necessary for the location of the mirror carrier 3 and the values a and b to be corrected again.

The location of the mirror carrier 3 is defined by a reference point RP on the mirror carrier 3, which has to be easily accessible for measuring operations, in relation to one or more adjacent optical elements. Specific surfaces on the optical elements themselves, mounts or some or other component may be used as the reference point for the location of the mirror carrier.

Figure 12:
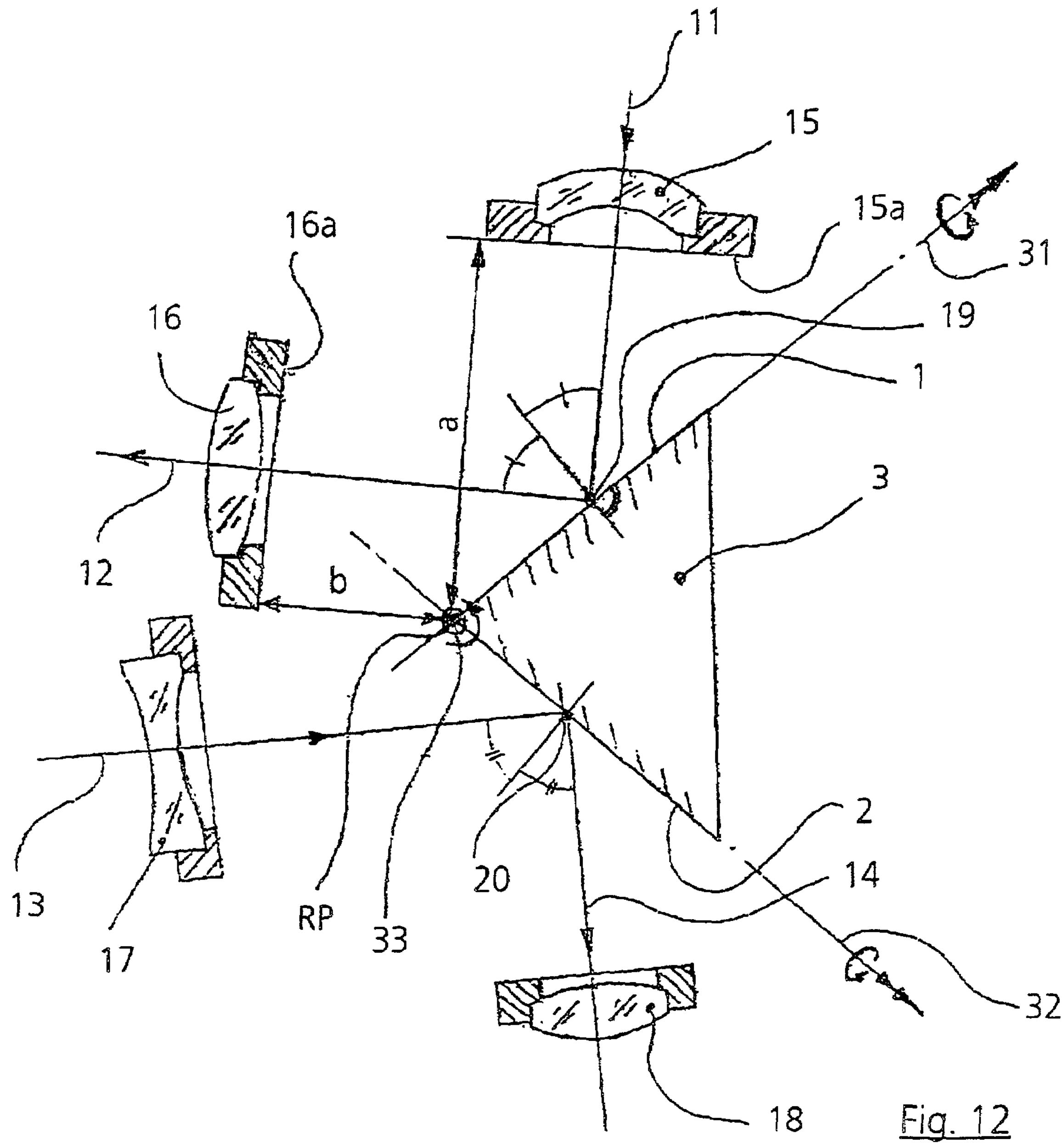
FIG. 12 shows a mirror carrier according to FIG. 10 with a reference point (RP)

In FIG. 12, for example, the surface 15*a* on the mount for the lens 15 and the surface 16*a* on the mount for the lens 16 serve as reference planes for the location of the reference point RP on the mirror carrier. The reference point RP is intended to be spaced apart from the surface 15*a* by the distance a and from the surface 16*a* by the distance b.

The location of the prism reference point RP perpendicular to the drawing plane is not taken into consideration since a displacement of the mirror carrier 3 in this direction causes the mirrors 1 and 2 to be replicated as before, no optical effects occurring as a result.

As an alternative to the reference surfaces 15*a* and 16*a*, of course, it is also possible to select surfaces on the mounts for the lenses 17 and 18 or else on other components.

During the subsequent tilting adjustment of the mirror carrier 3, the location must not be adjusted out of line. It is thus necessary for all three tilting axes 31, 32 and 33, which are linearly independent of one another, to run through the reference point RP on the mirror carrier 3. There are then no translatory displacements, which would mean a change in location, at the reference point RP.

Figure 13:
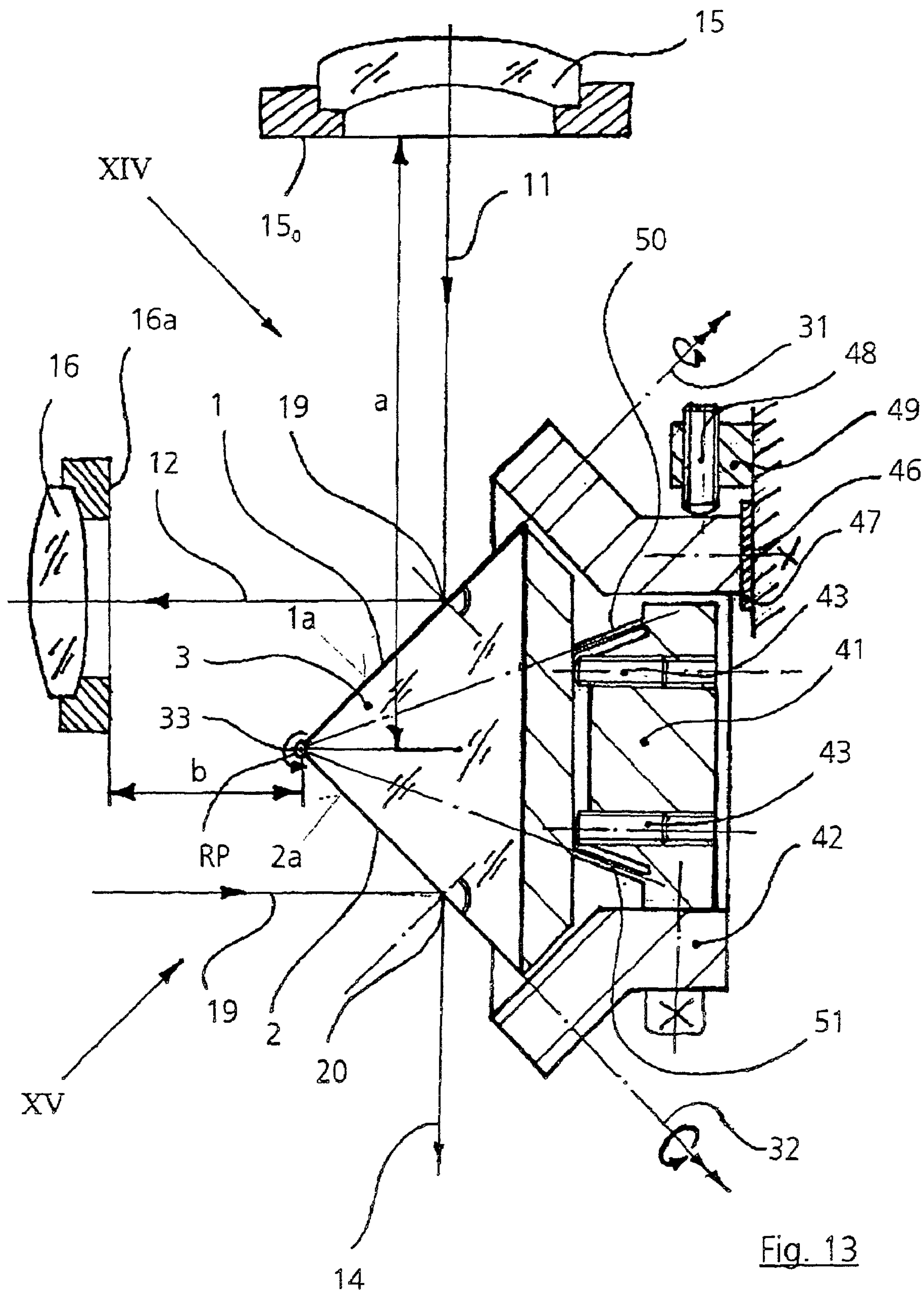
FIG. 13 shows a design of the apparatus according to FIG. 11 in accordance with the section along line XIII—XIII from FIG. 14.
Figure 14:
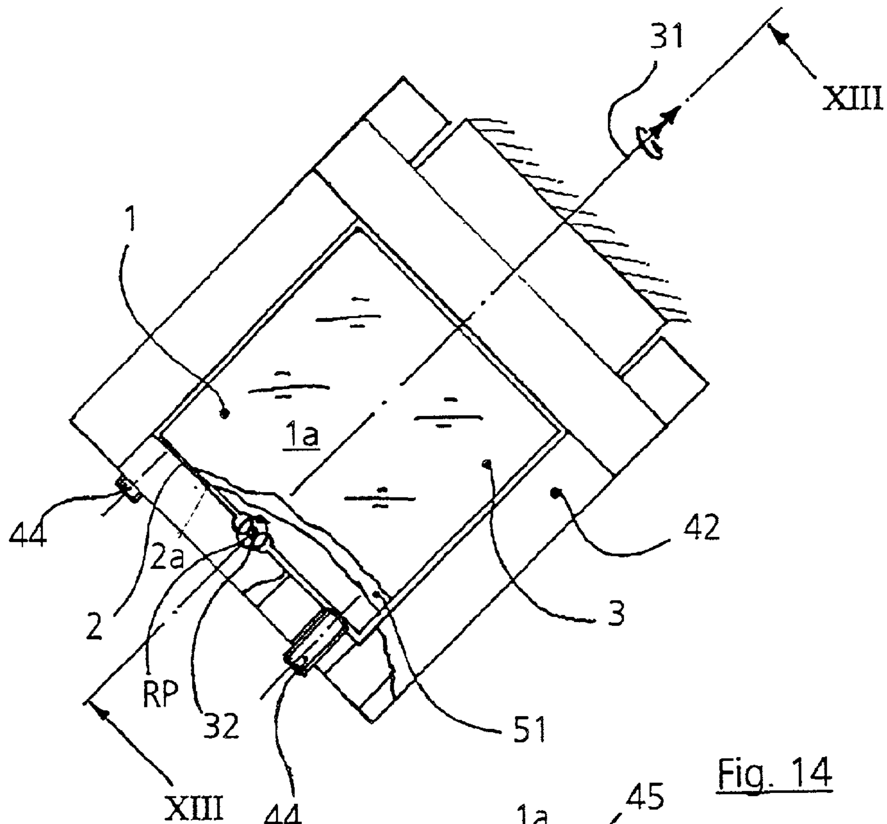
FIG. 14 shows a view of the apparatus according to the invention from FIG. 13 as seen in arrow direction XIV.
Figure 15:
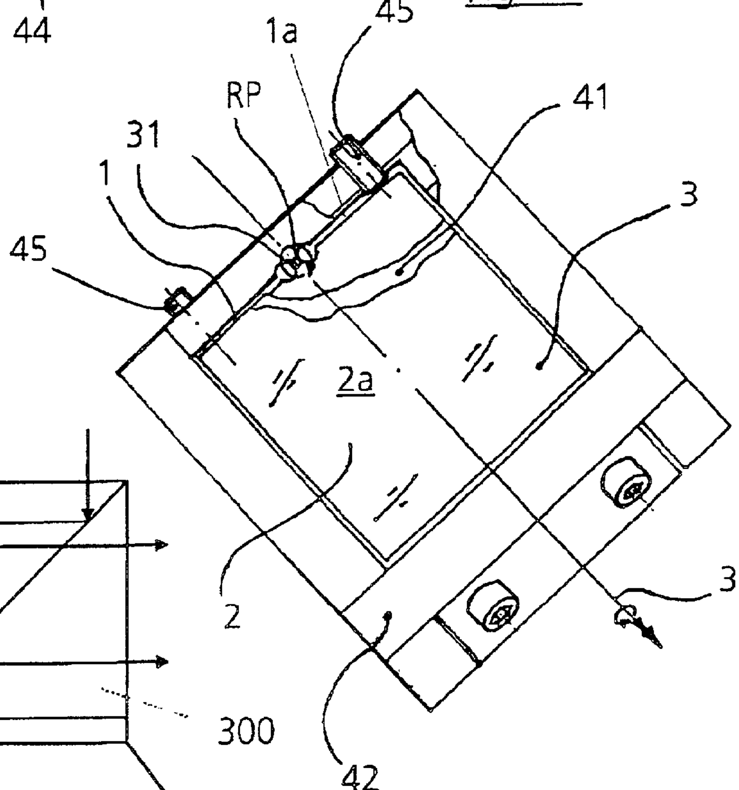
FIG. 15 shows a view of the apparatus according to the invention from FIG. 13 as seen from arrow direction XV.

FIGS. 13, 14 and 15 show an example, in order to fulfil this condition, of an apparatus for adjusting a mirror carrier 3 with the mirrors 1 and 2.

The frame 42 is connected firmly, by way of its connection surface 46 and an adjusting plate 47, to the outside, e.g. the housing part 49 of a lens system. The adjusting plate 47 serves for adjusting the value b.

For adjusting the value a, use is made of an adjusting screw 48, of which the nut thread is connected firmly to the outside or to the lens-system housing part 49.

The frame 42 also has the solid-state tilting articulation 41 connected to it. Two solid-state articulations are accommodated in the frame 42, one allowing tilting about the axis 32 and the other allowing tilting about the axis 31.

The adjusting screws 44 are used to adjust the tilting about the axis 32 and to fix the same, and the adjusting screws 45 are used to adjust tilting about the axis 31 and to fix the same.

Webs 50 and 51 in the solid-state tilting articulation 41 are aligned in relation to the reference point RP such that they form a four-bar mechanism. The instantaneous center of rotation of the four-bar linkage is located at the reference point RP, with the result that the tilting axis 33 is located perpendicularly to the drawing plane, at the reference point RP. The adjusting screws 45 can be used to adjust tilting about the axis 33 and to fix the same.

The mirror carrier 3 is connected firmly, via its rear side, to the solid-state tilting articulation 41.

The tilting axes 31, 32 and 33 are linearly independent and always pass through the reference point RP on the mirror carrier 3. The tilting axis 31 runs randomly through the mirror plane 1*a*, and the tilting axis 32 also runs randomly through the mirror plane 2*a*.

The essence of the invention is the arrangement of the tilting axes 31, 32 and 33, which are linearly independent of one another and all run through the reference point RP. This allows tilting and adjustment of the mirror carrier 3 in three directions in space without the location of the mirror carrier 3 changing and having to be readjusted.

Of course, it is also possible for the solid-state articulations in the apparatus, which are illustrated here by way of example, to be replaced by others, e.g. by rotary articulations, provided they allow tilting of the mirror carrier about three independent axes (cardanic suspension) which all intercept at a defined point of the mirror carrier 3. This defined point serves, at the same time, as the reference point RP for determining the location of the mirror carrier 3.

Figure 16:
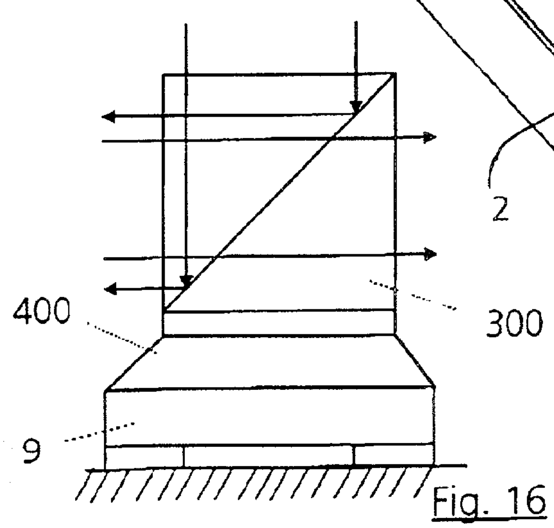
FIG. 16 shows a beam splitter cube mounted on a manipulator for adjusting and tilting.

FIG. 16 shows a beam splitter in the form of a beam splitter cube 300 which corresponds to the carrier 3 with the two mirror planes 1 and 2. Beam splitters are well known in the art, see for example the U.S. Pat. No. 6,252,712. The apparatus for tilting as described in the following can be used in an optical system as disclosed in the U.S. Pat. No. 6,252,712. The beam splitter cube 300 is mounted on a manipulator 400 which corresponds to the top plate 4 of FIG. 1. For adjusting and tilting the beam splitter cube 300, the manipulator 400 is connected with a base plate 9 in an accurate way as described in FIGS. 1 to 15, especially in FIG. 1.

By tilting the manipulator 400 against the base plate 9, the beam splitter cube 300 can be tilted and adjusted in the same way as the mirror carrier 3 with the mirror planes 1 and 2 as optical faces.

The optical faces of the beam splitter cube 300 are the entrance and exit surfaces for the beams.

What is claimed is:

1. An apparatus for tilting an optical element, the apparatus comprising:

- a frame;
- a carrier fastened on the frame via at least one articulated connection;
- an optical element supported on the carrier and having first and second optical faces, the first and second optical faces being arranged together on the carrier and being fixed at a fixed angle relative to one another, wherein the carrier is arranged to pivot about three tilting axes, the first optical face is capable of tilting about a first tilting axis that extends normal to the plane of the second optical face, the second optical face is capable of tilting about a second tilting axis that extends normal to the plane of the first optical face, and a third tilting axis being located parallel to the line of intersection between the two planes of the first and second optical faces; and
- wherein said first tilting axis is located at the point at which a first optical axis passes through the plane of said first optical face, and in that said second tilting axis is located at the point at which a second optical axis passes through the plane of the second optical face.

2. The apparatus of claim 1, wherein said first and second optical faces each comprise a mirror.

3. The apparatus of claim 1, wherein said first and second optical faces each comprise a plane mirror.

4. The apparatus of claim 1, wherein the optical element comprises a beam splitter.

5. The apparatus of claim 1, wherein the optical element comprises a beam splitter cube.

6. The apparatus of claim 1, wherein said carrier is connected cardanically to said frame.

7. The apparatus of claim 1, wherein said at least one articulated connection is designed as a solid-state articulation.

8. The apparatus of claim 7, wherein said solid-state articulation is adjustable by an adjusting screw.

9. The apparatus of claim 1, wherein said tilting axes form a four-bar linkage.

10. An apparatus for tilting two optical elements, the apparatus comprising:

a frame;

a carrier fastened on the frame via at least one articulated connection;

two optical elements supported on the carrier, each optical element comprising an optical face, first and second optical faces, respectively, the first and second optical faces being arranged together on the carrier and being fixed at a fixed angle relative to one another, wherein the carrier is arranged to pivot about three tilting axes, the first optical face is capable of tilting about a first tilting axis that extends normal to the plane of the second optical face, the second optical face is capable of tilting about a second tilting axis that extends normal to the plane of the first optical face, and a third tilting axis being located parallel to the line of intersection between the two planes of the first and second optical faces; and wherein said at least one articulated connection is designed as a solid-state articulation.

11. The apparatus of claim 10, wherein said solid-state articulation is adjustable by an adjusting screw.

12. The apparatus of claim 10, wherein said solid-state articulation forms a four-bar mechanism.

13. The apparatus of claim 10, wherein said first tilting axis is located at the point at which a first optical axis passes through the plane of said first optical face, and in that said second tilting axis is located at the point at which a second optical axis passes through the plane of the second optical face.

14. An apparatus for tilting an optical element, the apparatus comprising:

a frame;

a carrier fastened on the frame via at least one articulated connection;

an optical element supported on the carrier and having first and second optical faces, the first and second optical faces being arranged together on the carrier and being fixed at a fixed angle relative to one another, wherein the carrier is arranged to pivot about three tilting axes, the first optical face is capable of tilting about a first tilting axis that extends normal to the plane of the second optical face, the second optical face is capable of tilting about a second tilting axis that extends normal to the plane of the first optical face, and a third tilting axis being located parallel to the line of intersection between the two planes of the first and second optical faces; and wherein said tilting axes form a four-bar linkage.

15. The apparatus of claim 14, wherein said first and second optical faces each comprise a mirror.

16. The apparatus of claim 14, wherein said first tilting axis is located at the point at which a first optical axis passes through the plane of said first optical face, and in that said second tilting axis is located at the point at which a second optical axis passes through the plane of the second optical face.

17. The apparatus of claim 14, wherein the optical element comprises a beam splitter.

18. An apparatus for tilting at least two optical elements, the apparatus comprising:

a frame;

a carrier fastened on the frame via at least one articulated connection;

at least two optical elements supported on the carrier and arranged together on the carrier at a fixed angle relative to one another; and wherein the carrier is arranged to pivot about a plurality of tilting axes which all run through a reference point, the reference point being spaced from the at least one articulated connection.

19. The apparatus of claim 18, wherein said reference point is arranged on said carrier.

20. The apparatus of claim 18, wherein said carrier is arranged to pivot about three tilting axes.

21. The apparatus of claim 18, wherein said at least two optical elements each comprise a mirror.

22. The apparatus of claim 18, wherein said at least one articulated connection is designed as a solid-state articulation.

23. The apparatus of claim 22, wherein said solid-state articulation forms a four-bar mechanism.

24. The apparatus of claim 23, wherein said solid-state articulation comprises webs directed towards said reference point.

25. The apparatus of claim 18, wherein one of the at least two optical elements comprises a plane, and wherein at least one of the plurality of the tilting axes extends within the plane of the one optical element.

26. The apparatus of claim 25, wherein each of the at least two optical elements comprises a plane, and wherein the plurality of the tilting axes comprises one tilting axis extending within each plane of the at least two optical elements.

27. An apparatus for tilting at least two optical elements, the apparatus comprising:

a frame;

a carrier fastened on the frame via at least one articulated connection;

at least two optical elements supported on the carrier and arranged together on the carrier at a fixed angle relative to one another; and wherein the carrier is arranged to pivot about a plurality of tilting axes which all run through a reference point, and wherein said reference point is arranged on said carrier.

28. An apparatus for tilting at least two optical elements, the apparatus comprising:

a frame;

a carrier fastened on the frame via at least one articulated connection;

at least two optical elements supported on the carrier and arranged together on the carrier at a fixed angle relative to one another;

wherein the carrier is arranged to pivot about a plurality of tilting axes which all run through a reference point; and wherein said at least one articulated connection is designed as a solid-state articulation, and wherein said solid-state articulation forms a four-bar mechanism.

29. The apparatus of claim 28, wherein said solid-state articulation comprises webs directed towards said reference point.

30. An apparatus for tilting at least two optical elements, the apparatus comprising:

a frame;

a carrier fastened on the frame via at least one articulated connection, said at least one articulated connection is designed as a solid-state articulation;

at least two optical elements supported on the carrier and arranged together on the carrier at a fixed angle relative to one another; and wherein the carrier is arranged to pivot about more than two tilting axes which all run through a reference point.

31. The apparatus of claim 30, wherein said at least one solid-state articulation comprises at least three solid-state articulations.

32. An apparatus for tilting at least two optical elements, the apparatus comprising:

a frame a carrier fastened on the frame via at least one articulated connection;

at least two optical elements supported on the carrier and arranged together on the carrier at a fixed angle relative to one another;

wherein the carrier is arranged to pivot about a plurality of tilting axes which all run through a reference point, and said reference point is formed by a point of intersection between the at least two optical elements; and wherein said reference point is arranged on said carrier.

33. An apparatus for tilting at least two optical elements, the apparatus comprising:

a frame a carrier fastened on the frame via at least one articulated connection;

at least two optical elements supported on the carrier and arranged together on the carrier at a fixed angle relative to one another;

wherein the carrier is arranged to pivot about a plurality of tilting axes which all run through a reference point, and said reference point is formed by a point of intersection between the at least two optical elements; and wherein said at least one articulated connection is designed as a solid-state articulation, said solid-state articulation forms a four-bar mechanism.

* * * * *

UNITED STATES PATENT AND TRADEMARK OFFICE

CERTIFICATE OF CORRECTION

PATENT NO. : 7,014,328 B2
APPLICATION NO. : 10/119182
DATED : March 21, 2006
INVENTOR(S) : Ulrich Weber et al.

It is certified that error appears in the above-identified patent and that said Letters Patent is hereby corrected as shown below:

Col. 3, line 65 –
Replace "to adjust tilting about the $\Phi_x$ axis. The adjusting screw 7,"
With --to adjust tilting about the $\varphi_x$ axis. The adjusting screw 7,--

Col. 3, line 67 –
Replace "used to adjust tilting about the $\Phi_y$ axis and the adjusting"
With --used to adjust tilting about the $\varphi_y$ axis and the adjusting--

Col. 4, line 1 –
Replace "screw 8 is used to adjust tilting about the $\Phi_z$ axis. All three"
With --used to adjust tilting about the $\varphi_z$ axis and the adjusting--

Col. 4, line 16 –
Replace "two air clearances and the three dihedral angles $\Phi_x$, $\Phi_y$, and $\Phi_z$."
With --two air clearances and the three dihedral angles $\varphi_x$, $\varphi_y$, and $\varphi_z$.--

Col. 4, line 19 –
Replace "normal to the drawing plane causes he mirrors 1 and 2 to be"
With --normal to the drawing plane causes the mirrors 1 and 2 to be--

Col. 4, line 29 –
Replace "If the air clearances 21 to 24 are coordinated and the three"
With --If the air clearances 21 to 24 are co-ordinated and the three--

Col. 4, line 53 –
Replace "If, for example, the $\Phi_z$ tilting angle of the mirror 1 is"
With --If, for example, the $\varphi_z$ tilting angle of the mirror 1 is--

Col. 4, line 66 –
Replace "carrier 3, the $\Phi_z$ tilting angle adjustment of one mirror is"
With --carrier 3, the $\varphi_z$ tilting angle adjustment of one mirror is--

Col. 4, line 67 –
Replace "inevitably accompanied by the $\Phi_z$ tilting angle adjustment of"
With --inevitably accompanied by the $\varphi_z$ tilting angle adjustment of--

CERTIFICATE OF CORRECTION

PATENT NO. : 7,014,328 B2
APPLICATION NO. : 10/119182
DATED : March 21, 2006
INVENTOR(S) : Ulrich Weber et al.

It is certified that error appears in the above-identified patent and that said Letters Patent is hereby corrected as shown below:

Col. 5, line 2 –
Replace “common carrier, separation of the $\Phi_z$ tilting movement is not”
With --common carrier, separation of the $\varphi_z$ tilting movement is not--

Col. 5, line 4 –
Replace “The only possible improvement in the case of the $\Phi_z$ tilting”
With --The only possible improvement in the case of the $\varphi_z$ tilting--

Col. 5, line 6 –
Replace “In the case of the $\Phi_x$ and $\Phi_y$ tilting angle of one of the two”
With --In the case of the $\varphi_x$ and $\varphi_y$ tilting angle of one of the two--

Col. 6, line 36 –
Replace “the angle $\Phi$ into the position 1’.”
With --the angle $\varphi$ into the position 1’.--

Col. 6, line 39 –
Replace “By virtue of the mirror 1 being tilted through the angle $\Phi$,”
With --By virtue of the mirror 1 being tilted through the angle $\varphi$,--

Col. 6, line 41 –
Replace “deviates by the angle 2$\Phi$ from the original optical axis 12, the”
With --deviates by the angle 2$\varphi$ from the original optical axis 12, the--

Col. 6, line 51 –
Replace “tilting angles $\Phi$, by the following formula. The angle *c* here”
With --tilting angles $\varphi$, by the following formula. The angle $\varepsilon$ here--

Col. 6, line 62 –
Replace “tilting angle $\Phi$, and thus contributes the most to the lateral”
With --tilting angle $\varphi$, and thus contributes the most to the lateral--

Col. 6, line 63 –
Replace “offset u in the case of small tilting angles $\Phi$. In order for this”
With --offset u in the case of small tilting angles $\varphi$. In order for this--

UNITED STATES PATENT AND TRADEMARK OFFICE
CERTIFICATE OF CORRECTION

PATENT NO. : 7,014,328 B2
APPLICATION NO. : 10/119182
DATED : March 21, 2006
INVENTOR(S) : Ulrich Weber et al.

It is certified that error appears in the above-identified patent and that said Letters Patent is hereby corrected as shown below:

Col. 7, line 10 –
Replace "$u_{min}$ on the tilting angle Φ, very small tilting angles Φ only"
With --$u_{min}$ on the tilting angle φ, very small tilting angles φ only--

Col. 7, line 56 –
Replace "axis 32 and to fix the same FIG. 8)."
With --axis 32 and to fix the same (FIG. 8)--

Col. 8, line 34 –
Replace "can be used to adjust the tilting about the $\Phi_x$ axis, the"
With --can be used to adjust the tilting about the φ axis, the--

Col. 8, line 36 –
Replace "drawing plane, can be used to adjust the tilting about the $\Phi_y$ axis,"
With --drawing plane, can be used to adjust the tilting about the $\varphi_y$ axis,--

Col. 8, line 38 –
Replace "the $\Phi_z$ axis. As in the first exemplary embodiment, all three"
With --the $\varphi_z$ axis. As in the first exemplary embodiment, all three--

Col. 8, line 57 –
Replace "If, for example, the mirror carrier 3 is adjusted by the $\Phi_z$"
With --If, for example, the mirror carrier 3 is adjusted by the $\varphi_z$--

Col. 8, line 59 –
Replace "accordance with the vector $v_{\Phi z}$ shown, since the point of"
With --accordance with the vector $v_{\varphi z}$ shown, since the point of--

UNITED STATES PATENT AND TRADEMARK OFFICE

CERTIFICATE OF CORRECTION

PATENT NO. : 7,014,328 B2
APPLICATION NO. : 10/119182
DATED : March 21, 2006
INVENTOR(S) : Ulrich Weber et al.

It is certified that error appears in the above-identified patent and that said Letters Patent is hereby corrected as shown below:

Cols. 13 and 14, lines 8 and 3, claims 32 and 33 –
Replace “a frame” With --a frame;--

Signed and Sealed this

Ninth Day of January, 2007

JON W. DUDAS
*Director of the United States Patent and Trademark Office*